United States Patent [19]

Reinbacher

[11] 4,082,025
[45] Apr. 4, 1978

[54] RING CUTTING TOOL AND ACCESSORY

[76] Inventor: Helmut Reinbacher, 1350 Crescent Heights St., Los Angeles, Calif. 90046

[21] Appl. No.: 672,253

[22] Filed: Mar. 31, 1976

[51] Int. Cl.² ........................ B26D 7/02; B26D 7/06
[52] U.S. Cl. ..................................... 83/411 R; 83/54
[58] Field of Search ............... 83/54, 411 R, 453, 474, 83/475, 476, 477.2

[56] References Cited

U.S. PATENT DOCUMENTS

| 3,066,564 | 12/1962 | Carpenter | 83/411 R X |
| 3,665,797 | 5/1972 | Gilham | 83/411 R |

Primary Examiner—Othell M. Simpson
Assistant Examiner—John Sipos
Attorney, Agent, or Firm—Harris, Kern, Wallen & Tinsley

[57] ABSTRACT

A tool for making a radial cut in the annulus of a ring, including a support holding a circular saw and a pair of jaws pivoted to each other and to the support for clamping the ring and moving it across the saw to form a cut through the annulus of the ring.

1 Claim, 8 Drawing Figures

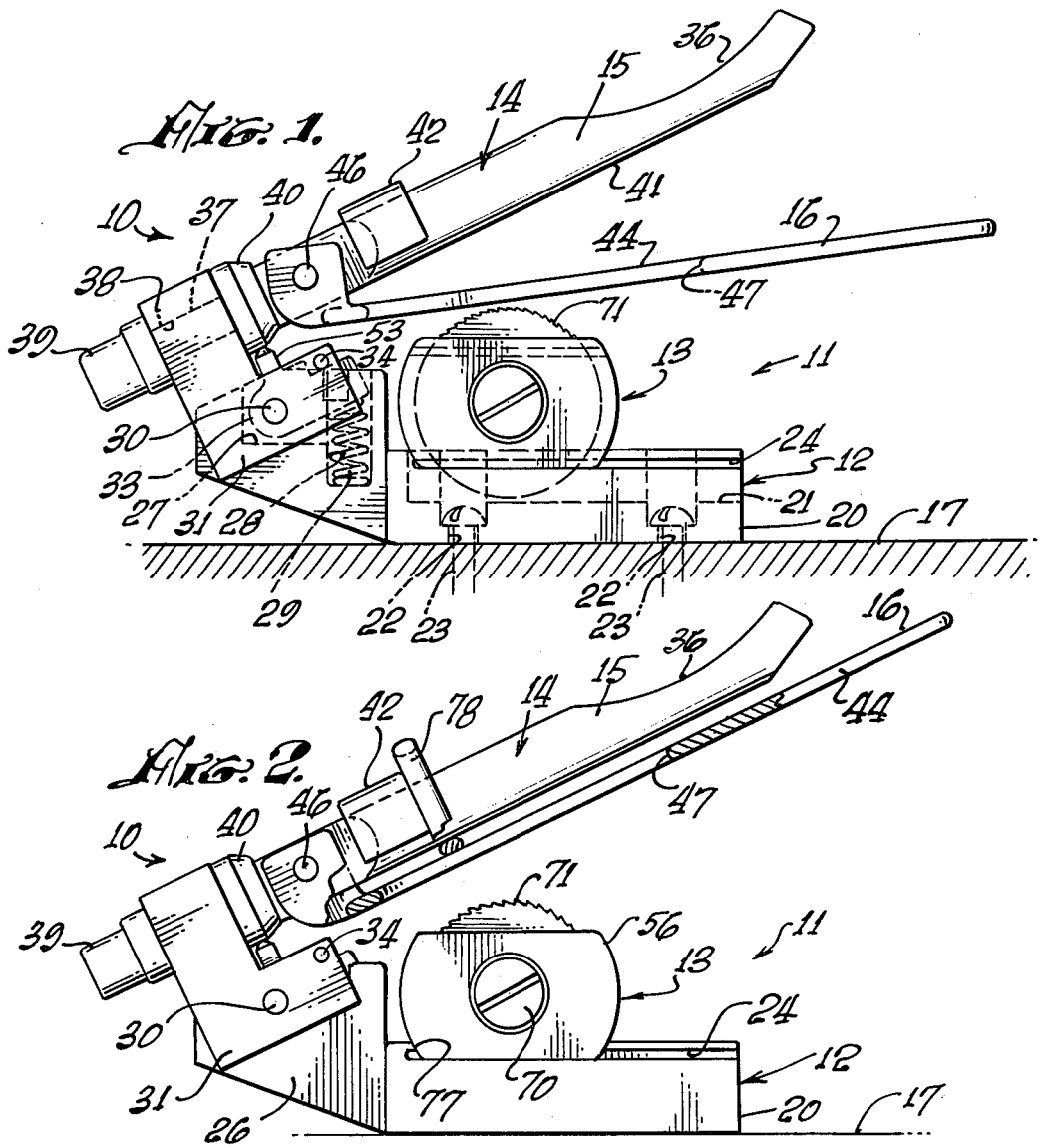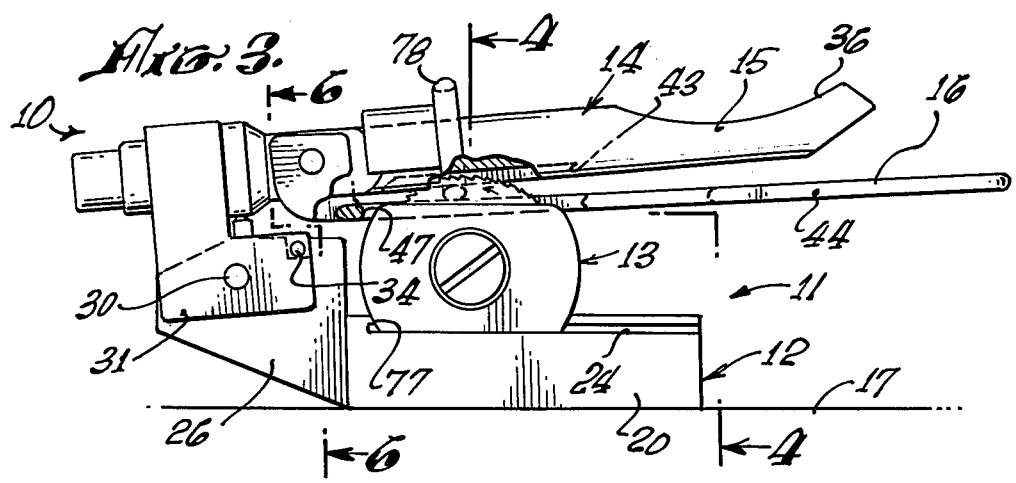

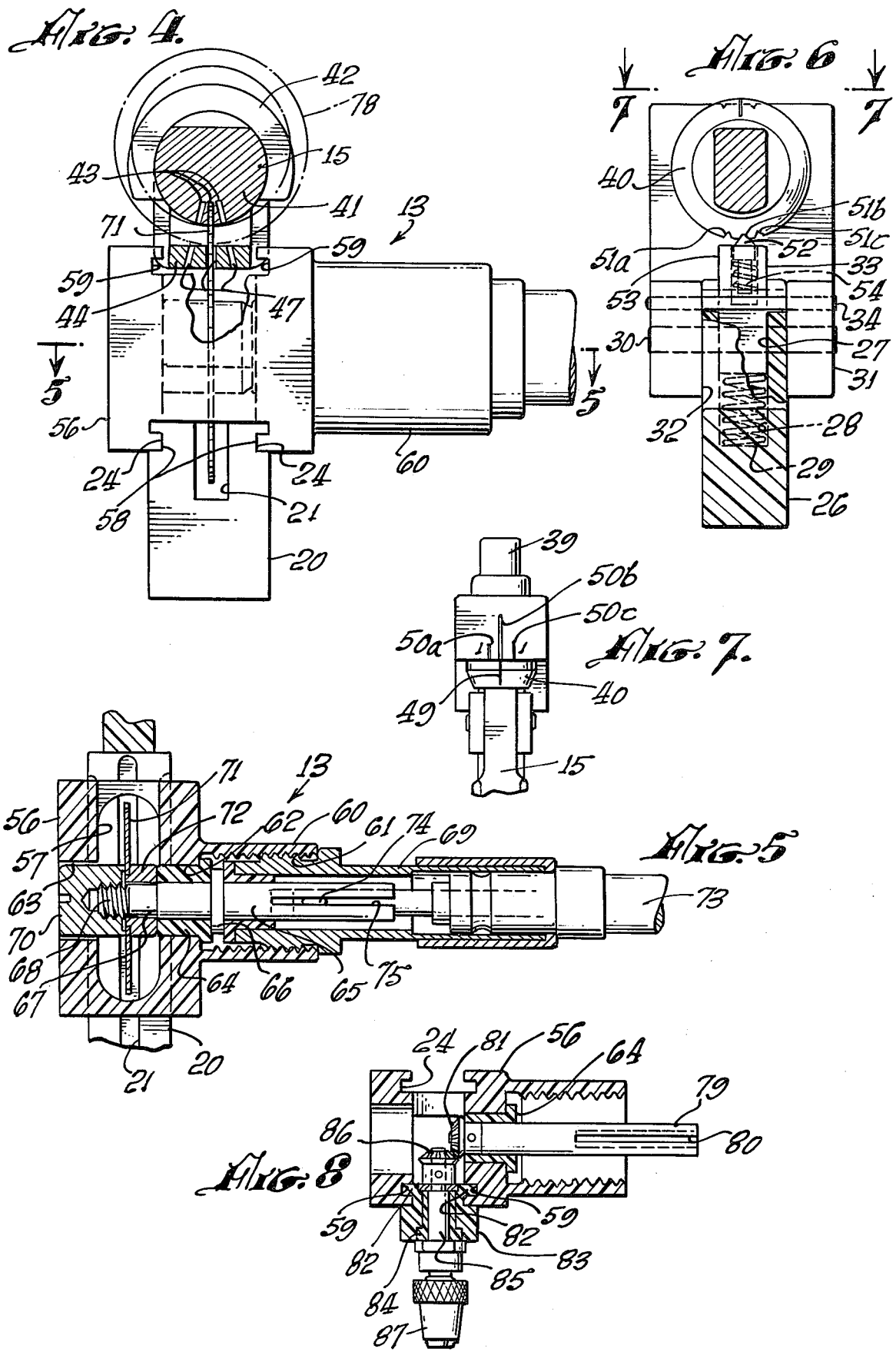

RING CUTTING TOOL AND ACCESSORY

BACKGROUND OF INVENTION

In the jewelers art it is common practice for a jeweler to enlarge or reduce the diameter of a finger ring to fit the finger of a user of the ring. This is normally accomplished by clamping the ring in a vise or other clamping device and then making a radial cut manually through the annulus of the ring by a hacksaw or other sawing device to remove a radial segment of the annulus.

If the diameter of the ring is to be enlarged, after a thin saw cut is made through its annulus its diameter is enlarged on a mandrel and an independent annulus segment of correct length is soldered into the opening formed in the annulus, resulting in a desired enlargement of the diameter and circumference of the ring.

If the diameter of the ring is to be reduced, its circumference must be reduced, frequently from 0.100 to 0.300 inches. This requires several separate saw cuts through the annulus to remove a segment of sufficient size, as saw blades normally employed for such purpose are less than 0.100 inches thick. The ring is then put on a mandrel and its circumference reduced to bring the edges of the total cut together following which they are soldered together, resulting in a ring of the desired reduced diameter and circumference. It is difficult, if not impossible, to make such cuts truly radial when the saw is held manually, resulting in the edges of the total cut not being parallel when the ring circumference is so reduced to bring such edges into engagement, which in turn makes soldering difficult and frequently results in a faulty appearance of the ring, which is undesirable.

In using a thin straight hacksaw blade or a thin power driven circular saw blade to make such conventional cuts through a ring the blades frequently break, due to manual relative twisting of the ring and saw blade during sawing, which requires replacement of the blade at substantial expense for blades and loss of labor time in the operation, both of which are undesirable.

Also, in employing such conventional manual method of making several cuts in a ring it is difficult, if not impossible, to optically gauge the proper desired separation of such cuts to result in a ring of the precise desired circumference, which is another disadvantage of such conventional method and practice.

The Invention - Generally

It is a primary object of the invention to provide a tool for making a transverse cut or transverse cuts through the annulus of a finger ring which are truly radial.

Another object of the invention is to provide such a tool in which the ring and saw making the cut or cuts are rigidly held in a desired relationship to minimize saw breakage, otherwise due to relative transverse movement between the saw and ring during cutting.

A further object of the invention is to provide such a tool which can make two such cuts in a ring separated a predetermined and indexed distance, to insure accuracy of the relative location of such cuts.

To accomplish the foregoing objects I prefer to provide a tool having a base for journalling a circular saw blade adapted to be rotated by a power source, a jig pivoted to such base and adapted to clamp a finger ring perpendicularly relative to the saw blade, the jig being movable relative to the saw blade to bring the ring into cutting relationship with the saw blade to enable the saw blade to make a radial cut through the annulus of the ring.

Still another object of the invention is to provide such a tool in which the jig is rotatable on its own axis by predetermined amounts to align different portions of the ring with the saw blade for a plurality of alternative radial cuts by the saw blade through the annulus of the ring, to permit the removal of a segment of predetermined size from the annulus.

A further object of the invention is to provide such a tool in which the base includes a first member to which the jig is pivoted and a second member which journals the saw blade and is readily removable from the first member for use independent of the remainder of the tool. Another object of the invention is to provide such a second member with connecting means for attachment to a power source, the saw blade being readily removable therefrom and a drill chuck adapted to support a rotary drill being substitutable therefor to permit said second member to be used either as a power driven circular saw, in or independent of the remainder of the tool, or as an independent power driven drill.

THE DRAWINGS

In the drawings, which are for the purpose of illustration only:

FIG. 1 is an elevational view of the tool of the invention;

FIG. 2 is a view similar to FIG. 1, but showing a finger ring clamped in the tool;

FIG. 3 is a view similar to FIG. 2 but showing the ring in cutting relation with the circular saw of the invention;

FIG. 4 is a cross-sectional view taken on the line 4—4 of FIG. 3;

FIG. 5 is a longitudinal view partly in section taken on the line 5—5 of FIG. 4;

FIG. 6 is a cross-sectional view taken on the line 6—6 of FIG. 3;

FIG. 7 is a fragmentary plan view taken on the line 7—7 of FIG. 6; and

FIG. 8 is a fragmentary view of a portion of the mechanism of FIG. 5 with a rotary drill substituted for the circular saw of FIG. 5.

DETAILED DESCRIPTION OF THE INVENTION

Referring to the drawings, FIGS. 1, 2, and 3 show a tool 10 including saw support means 11 including a base member 12 and a saw support member 13, the tool including jig means 14 pivoted to the base member 12 and including an upper jaw element 15 and a lower jaw element 16 pivoted to the first jaw element, the tool being supported by a planar surface 17.

The base member 12 includes a rectangular block 20 having a longitudinal slot 21 interrupted by a pair of screw holes 22 adapted to receive screws 23 by which the block may be rigidly mounted on the planar surface 17, such as the top of a work bench. The sides of the block 20 are provided with a pair of parallel longitudinal grooves 24.

Integral with the lefthand end of the block 20, as seen in FIGS. 1-3, is an attachment member 26 having a central slot 27 interrupted by a spring bore 20 normal thereto and retaining a coil spring 29.

Pivoted to the attachment member 26, as by a cross-pin 30, is a jig support element 31 having a central slot 32 which fits over the attachment member 26, as best shown in FIG. 6, and extending into the central slot 27 of the member 26 is a biasing element 33 through which extends the cross-pin 30 and upon which the biasing element is pivoted. One end of the biasing element 33 engages the top of the coil spring 29, and an auxiliary cross-pin 34 limits counterclockwise rotation of the biasing element relative to the jig support element 31, the auxiliary cross-pin also limiting clockwise rotation of the jig support element relative to the attachment member 26 by engagement with the attachment member, as shown in FIG. 3.

The upper jaw element 15 of the jig means 14 is preferably provided with an arcuate finger grip area 36, a cylindrical area 37 which is journalled in a bore 38 of the jig support element 31 to permit rotation of the upper jaw element relative to the jig support element, the upper jaw element being rotationally retained in the support element by an outer collar 39 and an inner collar 40 rigidly mounted on the upper jaw element. At least a portion 41 of the upper jaw element 15 is preferably semicircular in cross-section, as shown in FIG. 4, and slidably carried thereon is a semicircular stop ring 42, making a tight but sliding fit with the upper jaw element. The bottom of the upper jaw element 15 is provided with a plurality of radial longitudinal slots 43, three in number as shown but more or less may be used as desired.

The lower jaw element 16 of the jig means 14 includes a substantially rectangular portion 44 and has a yoke 45 at its inner end which straddles the upper jaw element 15 and is hinged thereto by a pivot pin 46. The portion 44 is provided with a plurality of longitudinal slots 47, best shown in FIG. 4, each of which is aligned with a slot 43 in the upper jaw element 15.

Referring to FIGS. 1, 6, and 7, the inner collar 40 has on its top an index line 49 and the top of the jig support element 31 has three index lines 50a, 50b, and 50c with which the index line 49 may be aligned alternatively by rotating the jig means 14 relative to the jig support element. As shown in FIG. 6, the bottom of the collar 40 has three indentations 51a, 51b, and 51c adapted to be selectively engaged by an index pin 52 carried in a boss 53 on the top of the biasing element 33, the pin being biased against the collar by a coil spring 54. The indentation 51b is diametrically aligned with the index line 49 and longitudinally aligned with the central slot in each of the two groups of slots 43 and 47.

Referring to the saw support member 13, best shown in FIGS. 4 and 5, it includes a main block 56 having a central opening 57 and in the bottom a pair of parallel rails 58 adapted to fit and slide in the grooves 24 of the block 20 of the base member 12. Such fit is preferably tight so that the main block 56 will maintain its desired position on the block 20. The top of the main block 56 also preferably is provided with a pair of parallel grooves 59, for a purpose to be described hereinafter.

Projecting from a side of the block 56 and perpendicular thereto is a cylindrical boss 60 having internal threads 61 and the block is provided with aligned bores 62 and 63 concentric with the threads, the bore 62 having an annular bearing 64 formed of Teflon or other bearing material and fixed in the bore 62 by a press fit or otherwise. The bearing 64 journals a rotatable drive shaft 65 having an annular flange 66 which abuts against the outer end of the bearing, the left end of the shaft, as seen in FIG. 5, being of reduced diameter to provide a shoulder 67 and its outer end having external threads 68 which receive a removable cap screw 70 which clamps a circular saw blade 71 and an annular collar 72 against the shoulder 67, to rigidly mount the saw blade on the drive shaft. The internal threads 61 are adapted to receive a threaded tubular connector 69 which in turn receives the end of a rotary power driven cable mechanism 73 the end of which is provided with a key 74 which fits into a keyway 75 in the outer end of the drive shaft 65 to rotate the drive shaft. The connector 72, cable mechanism 73, and their connections to the boss 60 and drive shaft 65 are conventional and form no part of this invention.

To prepare the tool 10 for operation, the saw support member 13 is slided on the block 20 of the base member 10 to the position shown in FIGS. 1, 2, and 3, in which the main block 56 thereof engages a shoulder 77 which positions the support member in its desired position relative to the jig means 14. In this position the circular saw blade 71 is vertically aligned with the central slot of the two groups of slots 47 and 43 in the jaw elements 16 and 15, respectively. The coil spring 29 engages the biasing element 33, rotating it counterclockwise to the position seen in FIG. 1, and, through the engagement of the biasing element with the cross-pin 34 similarly rotates the jig support element 31 and the jig means 14. Such rotation is limited by engagement of jig support element 31 with the attachment member 26 in the position shown in FIG. 1, FIG. 1 illustrating the normal position of the parts of the tool 10 prior to operation. In this position, the weight of the lower jaw element causes it to pivot on the pivot pin 46 to the position shown in FIG. 1.

In operation, a conventional finger ring 78, in the form of an annulus, is slipped over the upper jaw element 15 to the position shown in FIGS. 2 and 3, in which it abuts the stop ring 42 and in which it is perpendicular to the longitudinal axis of the upper jaw element. The operator then manually grips between his fingers the finger grip area 36 and the bottom of the lower jaw element 16 opposite thereto, bringing the jaw elements together until they clamp the finger ring 78 therebetween as shown in FIG. 2. Assuming that the saw blade 71 is being rotated by the power driven cable 73, the jig means 14, with its jaw elements 15 and 16 clamping the finger ring 78 therebetween, is moved downwardly from the position shown in FIG. 2 to that shown in FIG. 3. In doing so, the central slot 47 of the lower jaw element 16 passes over the saw blade 71, the saw blade cuts a radial slot in the finger ring 78 and enters the central slot 43 of the upper jaw element 15, as shown in FIG. 3. Downward movement of the jig means 14 relative to the base member 12 is limited by engagement of the cross-pin 34 with the attachment member 26, as shown in FIG. 3. This prevents the cutting edge of the saw blade 71 from engaging and cutting into upper jaw element 15.

If only a single radial slot the width of the saw blade 71 is desired to be cut in the annulus of the finger ring 78, the jig means 14 is then moved upwardly from the cutting position shown in FIG. 3 to the position shown in FIG. 2, the jaw elements 15 and 16 are separated as shown in FIG. 1, and the finger ring is removed, following which the ring may be treated by conventional jewelers' procedures to enlarge or contract its circumference.

If it is desired to cut a radial slot in the finger ring 78 wider than the thickness of the saw blade 71, a first radial slot is first cut in the ring as described above, the jig means 14 is moved upwardly to the position shown in FIG. 2 and, while manually maintaining the ring clamped between the jaw elements 15 and 16 as shown therein, the jig means is rotated as a unit relative to the jig support element 31, either clockwise or counter-clockwise. This forces the index pin 52 out of the indentation 51b against the biasing action of the small coil spring 54 and permits the jig means 14 to be rotated until the index pin enters indentation 51a or 51c, depending upon which direction the jig means is rotated on its axis, and stops further such rotation of the jig means. The jig means 14 may then again be moved downwardly manually from the position shown in FIG. 2 to that shown in FIG. 3 and during such movement the saw blade 71 makes a second radial cut through the annulus of the finger ring, spaced a predetermined distance from the first cut made as described above, and a wider segment of the ring is removed, following which the ring is removed from the tool as described above for further treatment to enlarge or contract the circumference of the ring, but by a greater amount than by the single cut described above.

If it is desired to remove a still wider segment of the annulus of the ring 78, after clamping the ring in the jig means 14 as shown in FIG. 2, the jig means is rotated to a first position in which the index pin 52 enters the indentation 51a, which aligns outer slots of the slot groups 43 and 47 with the saw blade 71, the jig means then being moved down over the saw blade to make a first cut in the annulus of the ring, the jig means then being moved upwardly to the location shown in FIG. 2 and again rotated on its axis until the index pin falls into the indentation 51c, following which the jig means is again moved downwardly to the location shown in FIG. 3 during which the second radial cut is made in the annulus of the ring to remove a wider segment of the ring than in the first two-cut procedure described above.

Since the index lines 50a, b, and c shown in FIG. 7 correspond in location with the indentations 51a, b, and c, and the index line 49 corresponds in location with the index pin 52, and the index lines 50a, b, and c are separated a predetermined distance, the operator to cut a segment of desired width from the finger ring 78 merely sequentially rotates the jig means 14 relative to the saw blade 71 a desired distance by reference to such index lines. Since the finger ring 78 is clamped between the jaw elements 15 and 16 against the stop ring 42 in a position truly perpendicular to the axis of the jig means 14 and the saw blade 71 during each cutting operation, each cut made in its annulus is truly radial, which is an important advantage of the invention. Furthermore, the rotating saw blade 71 during each cutting operation is supported laterally by the slots 43 and 47 against distortion, which minimizes saw blade breakage during cutting, which is another substantial advantage of the invention.

The circular saw blade 71 may be replaced readily, if broken or unduly worn in operation, by detaching the saw support member 13 from the base member 12, unscrewing and detaching the cap screw 70, moving the drive shaft 65 to the right, as seen in FIG. 5, and out of the saw blade, following which the saw blade may be withdrawn from the central opening 57 of the main block 56 and replaced by a new blade, the latter being reassembled by a reverse procedure.

The saw support member 13 assembled as shown in FIG. 5 with its connector 72 and cable 73 and detached from the remainder of the tool 10, may be used separately as a circular saw device for any desired purpose, providing it with a separate utility which is another object of the invention. Or the saw support member 13 may be converted readily into another type of power driven tool, such as a rotary drill as shown in FIG. 8, which is a further object of the invention.

Referring to FIG. 8, the main block 56, from which the drive shaft 65, cap screw 70, saw blade 71, and collar 72 have been removed, is provided with a drive shaft 79 having a keyway 80, similar to the keyway 75, for connection to a power driven cable such as shown in FIG. 5, the drive shaft 79 being journalled by a bearing and provided at its internal end with a bevel gear 81. The grooves 59, which are not used in the embodiment of FIG. 4, slidably receive parallel rails 82 of a block 83 provided with a cylindrical bearing 84 which journals a stub shaft 85 having on its inner end a bevel gear 86 meshing with the bevel gear 81, and having on its outer end a conventional drill chuck 87 adapted to receive and retain a standard rotary drill (not shown). Rotation of the drive shaft 79 rotates the drill chuck 87 and with a standard drill therein the device may be used as a rotary drill. By sliding the block 83 out of the main block 56 and then withdrawing the drive shaft 79 out of the main block, the device may be converted readily back into a power saw as shown in FIG. 5 for use in the tool 10 or separately.

Although I have shown and described a tool and parts therefor having a variety of uses, it is to be understood that certain parts may be modified without departing from the spirit of the invention and I do not intend to be limited to the specific embodiment shown and described but desire to be afforded the full scope of the following claims.

I claim:
1. In a tool for cutting a ring transversely of the plane thereof, the combination of:
(a) saw support means;
(b) a circular saw rotatably mounted on said support means;
(c) jig means pivotally mounted on said support means for holding the ring and for moving the ring into cutting engagement with said circular saw with the plane of the ring perpendicular to the plane of said circular saw;
(d) said jig means including pivotally interconnected first and second jaw elements, said first jaw element being of a size to have the ring slipped thereover, and said second jaw element being pivotable toward said first jaw element to clamp the ring between said jaw elements;
(e) said second jaw element having a slot therethrough in the plane of said circular saw to permit said circular saw to pass through said second jaw element into cutting engagement with said ring; and
(f) said first jaw element having a groove therein in the plane of said circular saw to receive the periphery of said circular saw therein so that said circular saw can cut completely through the ring.

* * * * *